US008724069B2

(12) United States Patent
Hatakeyama (10) Patent No.: US 8,724,069 B2
(45) Date of Patent: May 13, 2014

(54) LIQUID CRYSTAL DISPLAY DEVICE (75) Inventor: Kenichi Hatakeyama, Mobara (JP)

(73) Assignee: Japan Display Inc., Tokyo (JP)

(*) Notice: Subject to any disclaimer, the term of this patent is extended or adjusted under 35 U.S.C. 154(b) by 185 days.

(21) Appl. No.: 13/343,004

(22) Filed: Jan. 4, 2012

(65) Prior Publication Data

US 2012/0176564 A1  Jul. 12, 2012

(30) Foreign Application Priority Data

Jan. 6, 2011  (JP) ................................. 2011-001301

(51) Int. Cl.
G02F 1/13452 (2006.01)
(52) U.S. Cl.
USPC ............ 349/150; 349/149; 349/151; 349/152
(58) Field of Classification Search
USPC ............. 349/56, 58, 149–152; 313/582–587, 313/506; 361/679.21, 679.3, 679.55, 361/679.56, 681
See application file for complete search history.

(56) References Cited

U.S. PATENT DOCUMENTS

| 7,728,918 | B2* | 6/2010 | Sakurai | 349/58 |
| 7,965,349 | B2 | 6/2011 | Oohira | |
| 8,379,163 | B2* | 2/2013 | Oohira | 349/56 |
| 2008/0043413 | A1* | 2/2008 | Okuda | 361/681 |
| 2009/0225253 | A1* | 9/2009 | Oohira | 349/58 |

FOREIGN PATENT DOCUMENTS

JP  2009-216753  9/2009

* cited by examiner

Primary Examiner — Bumsuk Won
Assistant Examiner — Jia Pan
(74) Attorney, Agent, or Firm — Antonelli, Terry, Stout & Kraus, LLP.

(57) ABSTRACT

A mounting unit of a second flexible circuit board is arranged on a rear surface side of a liquid crystal display panel. A portion of a first flexible circuit board at which a connection terminal is formed is bonded to an end portion of a display surface side of the liquid crystal display panel, is pulled out from the end portion of the liquid crystal display panel, is bent and overlapped with the opposite surface to the surface where the light emission components of the mounting unit are mounted with a space, and an external terminal is arranged on the rear surface side. An extended portion is pulled out from the mounting unit, is bent so as to return to the direction of the mounting unit, and is overlapped with the first flexible circuit board on an outer surface of the first flexible circuit board.

11 Claims, 7 Drawing Sheets

LIQUID CRYSTAL DISPLAY DEVICE

CROSS-REFERENCE TO RELATED APPLICATION

The present application claims priority from Japanese application JP2011-001301 filed on Jan. 6, 2011, the content of which is hereby incorporated by reference into this application.

BACKGROUND OF THE INVENTION

1. Field of the Invention

The present invention relates to a liquid crystal display device.

2. Description of the Related Art

A liquid crystal display device with a backlight which includes a liquid crystal display panel and light emission components, and uses a flexible circuit board for electrically connecting with the above is known. In addition, making a flexible circuit board for electrically connecting with the liquid crystal display panel, and a flexible circuit board for electrically connecting with the light emission components common with the liquid crystal display device is known. Specifically, the flexible circuit board with the light emission components is assumed to be bonded to the liquid crystal display panel (JP 2009-216753 A).

The flexible circuit board which is pulled out from the liquid crystal display panel has an external terminal for electrically connecting with the outside. Since there are many wirings which connect between the external terminal and the liquid crystal display panel, it is necessary to arrange the light emission components to avoid those wirings. That is, the light emission components are not arranged in the vicinity of the liquid crystal display panel, on the flexible circuit board, and are arranged at locations which are separated from the liquid crystal display panel.

The flexible circuit board which is extended from the liquid crystal display panel is bent, and the light emission components are arranged to be adjacent to the end portion of a light guide plate which is arranged on the rear side of the liquid crystal display panel. The position of the light emission components is the end portion of the liquid crystal display panel.

When the flexible circuit board is bent so that the light emission components are to be arranged at the end portion of the liquid crystal display panel, the majority of the flexible circuit board is in a state of protruding from the liquid crystal display panel and the backlight with rectangular shapes. Accordingly, by further bent portioning the flexible circuit board, and by overlapping the majority of the flexible circuit board with the liquid crystal display panel and the backlight, it is possible to make the appearance of the flexible circuit board similar to the liquid crystal display panel and the backlight, and to miniaturize the external form of the liquid crystal display device.

However, if the flexible circuit board is bent twice in this manner, a bent portion of the flexible circuit board which extends from the light emission components is arranged inside the bent portion which extends from the liquid crystal display panel. As a result, it is difficult to secure a space inside the bent portion which extends from the light emission components, and to insert other circuit boards inside thereof.

SUMMARY OF THE INVENTION

In a first aspect of the invention, an object of the invention is to provide a liquid crystal display device in which a flexible circuit board is bent so as to secure the space inside thereof.

A liquid crystal display device according to a first aspect of the invention includes, a first flexible circuit board in which a liquid crystal display panel having an image display surface, and a rear surface which is opposite the display surface, a connection terminal for being electrically connected to the liquid crystal display panel, and an external terminal for being electrically connected to the outside are formed; and a second flexible circuit board which includes a mounting portion for mounting light emission components, and an extended portion for being electrically connected to the first flexible circuit board, in which the mounting portion is arranged in the rear surface side of the liquid crystal display panel by making a surface on which the light emission components are mounted face the rear surface of the liquid crystal display panel, in which a portion of the first flexible circuit board at which the connection terminal is formed is bonded to an end portion of the display surface side of the liquid crystal display panel, is pulled out from the end portion of the liquid crystal display panel, and is bent and overlapped with a surface opposite the surface on which the light emission components of the mounting portion are mounted with a space, in which the external terminal is arranged in the rear surface, and in which the extended portion is pulled out from the mounting portion, is bent so as to return to the direction of the mounting portion, and is overlapped with the first flexible circuit board on an outer surface of the first flexible circuit board. According to the aspect of the invention, since the extended portion is arranged on the outer side of the first flexible circuit board, it is possible to secure a wide space in the first flexible circuit board.

In a second aspect of the invention, the liquid crystal display device according to the first aspect may have a configuration in which the first flexible circuit board and the second flexible circuit board are integrally formed, and in which the extended portion extends from a portion where the extended portion is overlapped with the outer surface of the first flexible circuit board so as to go beyond the first flexible circuit board, is bent so as to return to the direction of the first flexible circuit board, and is connected to the first flexible circuit board.

In a third aspect of the invention, the liquid crystal display device according to the first aspect may have a configuration in which the first flexible circuit board and the second flexible circuit board are formed as separate members, and in which the extended portion is bonded to the first flexible circuit board at a portion where the extended portion is overlapped with the outer surface of the first flexible circuit board, and is electrically connected to the first flexible circuit board.

In a fourth aspect of the invention, the liquid crystal display device according to any one of the first to third aspects may have a configuration in which a cutout of which the depth is the direction along a side of the end portion is formed in the first flexible circuit board, at a portion which is pulled out from the end portion of the liquid crystal display panel, and in which the extended portion is extended onto the outer surface of the first flexible circuit board from the mounting portion through the cutout.

In a fifth aspect of the invention, the liquid crystal display device according to any one of the first to third aspects may have a configuration in which the extended portion is extended from the mounting portion so as to protrude from the first flexible circuit board, and has a planar shape which extends so as to return to the direction of the first flexible circuit board at a position where overlapping with the first flexible circuit board is avoided.

In a sixth aspect of the invention, the liquid crystal display device according to any one of the first to fifth aspects may have a configuration in which the first flexible circuit board has the connection terminal and the external terminal at end portions opposite each other, and has the external terminal at the tip end of the liquid crystal display panel which is pulled out from the end portion.

In a seventh aspect of the invention, the liquid crystal display device according to any one of the first to sixth aspects may further include electronic components which are mounted onto the first flexible circuit board.

In an eighth aspect of the invention, the liquid crystal display device according to any one of the first to seventh aspects may have a configuration in which the first flexible circuit board and the second flexible circuit board are connected to each other only at the extended portion, and the extended portion is formed at a position which is biased in either direction along the width direction of a connection portion to the liquid crystal display panel of the first flexible circuit board.

In a ninth aspect of the invention, the liquid crystal display device according to any one of the first to eighth aspects may have a configuration in which the first flexible circuit board is extended to the direction opposite the bent side so as to go beyond the mounting portion, and the external terminal is arranged at a position beyond the mounting portion.

In a tenth aspect of the invention, a liquid crystal display device according to the invention includes, a liquid crystal display panel which includes a first substrate which forms a thin film transistor, a second substrate which forms a color filter, and liquid crystal which is interposed between the first substrate and second substrate; a backlight which is arranged at a rear surface side of the liquid crystal display panel; and a flexible circuit board which is connected to the first substrate, in which the flexible circuit board has a first flexible circuit board and second flexible circuit board which are integrally formed, in which the first flexible circuit board has a connection terminal which is connected to the liquid crystal display panel, and is extended to a rear surface side of the backlight by covering an end portion of the first substrate, in which the second flexible circuit board has a mounting portion on which light emission components are mounted, and an extended portion which connects the mounting portion to the first flexible circuit board, and in which the extended portion of the second flexible circuit board is arranged at a rear surface side of the first flexible circuit board, and is arranged at the backlight side rather than the first flexible circuit board of which mounting portion is arranged on the rear surface side of the backlight.

In an eleventh aspect of the invention, the liquid crystal display device according to a tenth aspect may have a configuration in which the first flexible circuit board includes a first bent portion which is convex in the direction away from the end portion of the first substrate, and is extended to the rear surface side of the backlight from the connection terminal which is connected to the liquid crystal display panel through the first bent portion, and in which the extended portion is arranged at the rear surface side rather than the first flexible circuit board which is arranged at the rear surface side of the backlight through a second bent portion which is convex in the direction opposite the first bent portion from the first flexible circuit board on the rear surface side of the backlight, and is connected to the mounting portion through a third bent portion which is convex in the same direction as the first bent portion.

In a twelfth aspect of the invention, the liquid crystal display device according to the tenth aspect in which the first flexible circuit board may include an external connection terminal to which data is input.

DETAILED DESCRIPTION OF THE INVENTION

Hereinafter, the embodiments of the invention will be described with reference to the drawings.

First Embodiment

Figure 1:
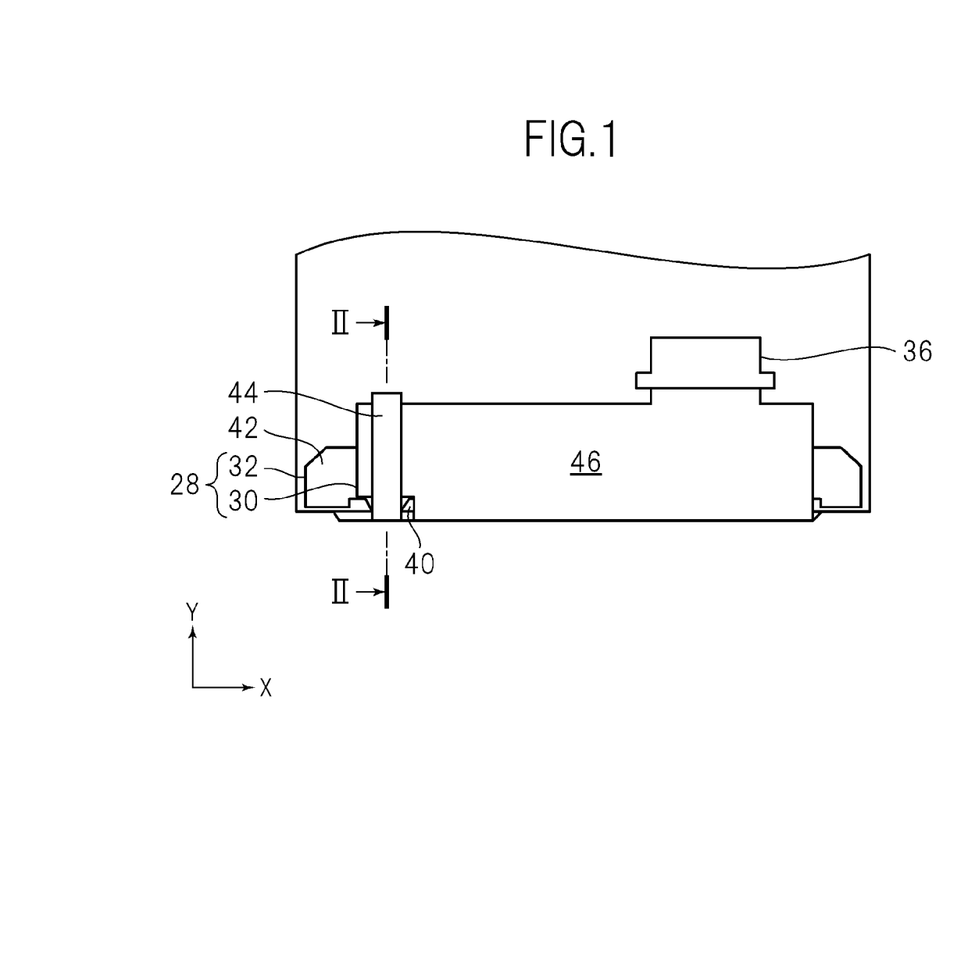
FIG. 1 is a diagram which shows a rear surface of a liquid crystal display device according to a first embodiment.
Figure 2:
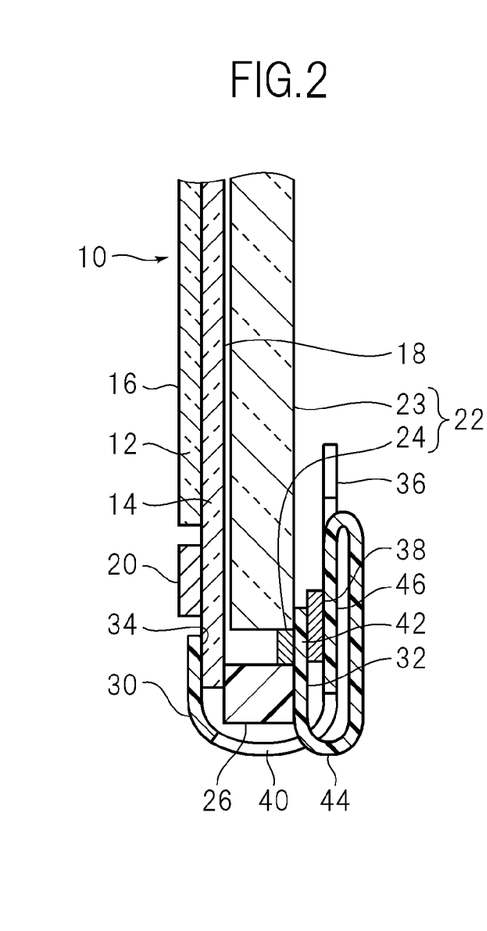
FIG. 2 is an enlarged cross-sectional view which is cut along line II-II of the liquid crystal display device in FIG. 1.
Figure 12:
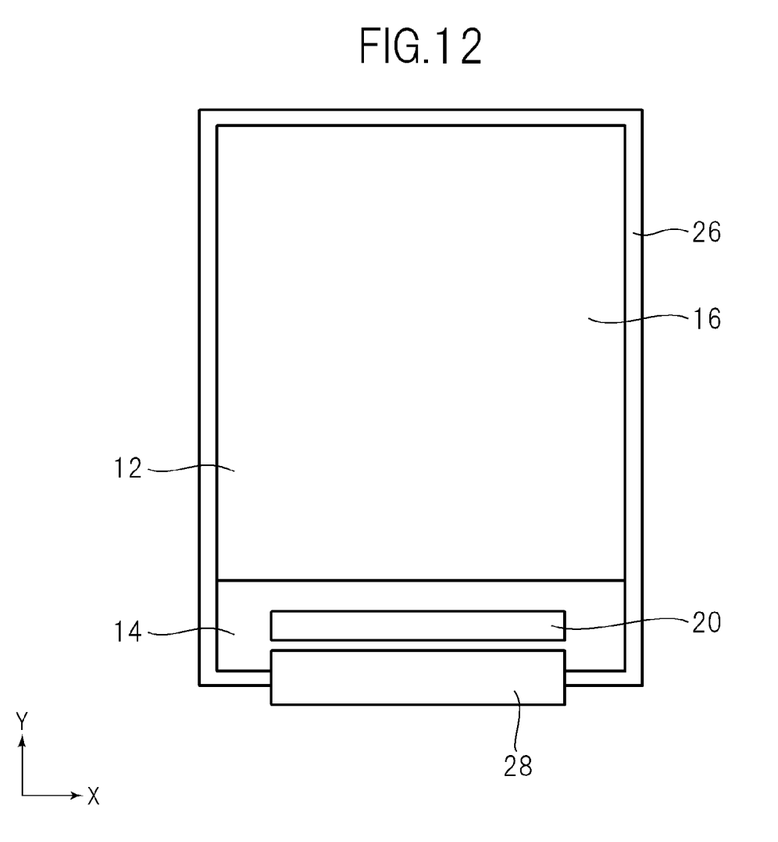
FIG. 12 is a front view which shows the entire liquid crystal display device according to the embodiments of the invention.

FIG. 1 is a diagram which shows a rear surface of a liquid crystal display device according to a first embodiment of the invention. FIG. 2 is an enlarged cross-sectional view which is cut along line II-II of the liquid crystal display device in FIG. 1. FIG. 12 is a front view when viewing the liquid crystal display device from a display surface side. A display surface of the liquid crystal display device is rectangular. In addition, the outer shape of the liquid crystal display device is rectangular, as well.

As shown in FIG. 2, the liquid crystal display device has a liquid crystal display panel 10. The liquid crystal display panel 10 has a pair of substrates 12 and 14, and liquid crystals, not shown, which are interposed therebetween. In the pair of substrates 12 and 14, the substrate 14 is arranged to be deviated so as to protrude from the other substrate 12. In addition, polarizing plates are arranged on the outer surface side of the pair of substrates 12 and 14, respectively, however, they are not shown in the drawing.

The liquid crystal display panel 10 has a display surface 16 on which images are displayed, and a rear surface 18 on the opposite side to the display surface 16. The display surface 16 is the outer surface of the short side substrate 12 (the opposite surface to the liquid crystal which is not shown) in the direction in which the pair of substrates 12 and 14 is deviated. The outer surface of the protruding substrate 14 (the opposite surface to the liquid crystals, not shown) is the rear surface 18 of the liquid crystal display panel 10. On the liquid crystal side of the surface side of the first substrate 14, pixels, a thin film transistor, and wirings connected to the thin film transistor are formed. In addition, an integrated circuit chip 20 in which a liquid crystal driving circuit is built in is mounted onto the protruding one side substrate 14 in a protruding region from the other substrate 12. The integrated circuit chip 20 drives the thin film transistor through wiring. The surface on which the integrated circuit chip 20 is mounted is the opposite surface to the rear surface 18 (a surface facing the same direction as the display surface 16) of the liquid crystal display panel 10. A color filter is formed on the surface of the liquid crystal side on the other second substrate 12, and it is possible to display images using the color filter.

The liquid crystal display device has a backlight 22 on the rear surface side of the liquid crystal display panel 10. The backlight 22 includes light emission components 24 as a light source (for example, light emitting diode), a light guide plate 23, an optical sheet (not shown) which is arranged between the light guide plate 23 and the liquid crystal display panel 10, a reflective sheet 50 which is arranged on a rear surface of the light guide plate 23 (refer to FIG. 5), or the like. The light from the light emission components 24 is input to an end surface of the light guide plate 23, and is output from a surface facing the liquid crystal display panel 10 of the light guide plate 23.

The backlight 22 and the liquid crystal display panel 10 are held by a frame 26 (inner frame, or an intermediate frame). The frame 26 is formed, for example, from molded resin. An upper frame and a lower frame (not shown) are provided in addition to the frame 26.

The liquid crystal display device has a flexible circuit board 28. Image data from the outside of the liquid crystal display device is transmitted to the integrated circuit chip 20 passing through the flexible circuit board 28. The flexible circuit board 28 is attached to the first substrate 14 of the liquid crystal display panel 10. The flexible circuit board 28 has a wiring pattern which is not shown, and is electrically connected to the liquid crystal display panel 10. The flexible circuit board 28 is arranged by being bent plural times as shown in FIG. 2. In the liquid crystal display device shown in FIGS. 1 and 2, the flexible circuit board is bent at three locations. In addition, the flexible circuit board 28 is bent such that a mounting unit 42 of a second flexible circuit board 32 is to be positioned at the center side of the liquid crystal display panel 10 rather than an external terminal 36.

Figure 3:
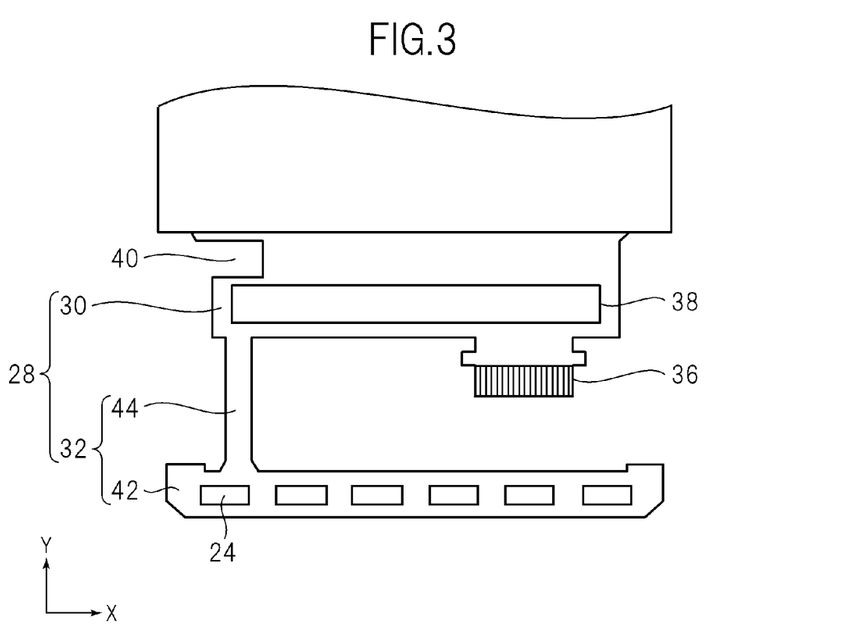
FIG. 3 is a diagram of the liquid crystal display device which shows a flexible circuit board which is expanded.

FIG. 3 is a diagram of the liquid crystal display device which is shown by expanding the flexible circuit board 28. According to the embodiment, the flexible circuit board 28 is a circuit board in which a first flexible circuit board 30 and the second flexible circuit board 32 are integrated. In other words, according to the description of the embodiment, the first flexible circuit board 30 and the second flexible circuit board 32 denote a part of the flexible circuit board 28, respectively. Since the first flexible circuit board 30 and the second flexible circuit board 32 are integrally formed, it is not necessary to perform connection processing of the first flexible circuit board 30 and the second flexible circuit board 32. In addition, since the first flexible circuit board 30 and the second flexible circuit board 32 are not joined by soldering, there is no concern of the connection coming off.

The liquid crystal display device has the first flexible circuit board 30. A connection terminal 34 (refer to FIG. 2) for electrically connecting with the liquid crystal display panel 10 is formed on the first flexible circuit board 30. In the first flexible circuit board 30, the connection terminal 34 is bonded to an end portion of the liquid crystal display panel 10 on the display surface 16 side. Specifically, the connection terminal 34 is bonded to a surface facing the same direction as the display surface 16 of the protruding substrate 14.

The external terminal 36 for electrically connecting to the outside is formed in the first flexible circuit board 30. The first flexible circuit board 30 has the external terminal 36 at the tip end thereof which is pulled out from the end portion of the liquid crystal display panel 10. As shown in FIG. 3, the connection terminal 34 and the external terminal 36 are located at end portions opposite each other in the length direction.

At least one electronic component 38 is mounted onto the first flexible circuit board 30. The electronic component 38 may be only a passive element such as a resistor, a capacitor, an inductor, or the like. The electronic component 38 is mounted between the connection terminal 34 and the external terminal 36.

A cutout 40 is formed on the first flexible circuit board 30. The cutout 40 is formed at a portion which is pulled out from the end portion of the liquid crystal display panel 10 with the direction along the side of the end portion as the depth.

The liquid crystal display device has the second flexible circuit board 32. The second flexible circuit board 32 has the mounting unit 42 which is mounted with at least one light emission component 24. The light emission component 24 and the electronic component 38 are arranged on the same surface of the flexible circuit board 28. In addition, the connection terminal 34 is formed on the same surface as that of the light emission component 24 and the electronic component 38. The second flexible circuit board 32 includes an extended portion 44 for being electrically connected to the first flexible circuit board 30. The extended portion 44 extends from the first flexible circuit board 30. According to the embodiment, the extended portion 44 before being bent extends straight in the Y direction. The first flexible circuit board 30 and the second flexible circuit board 32 (mounting unit 42) are connected to each other through at least one (one in FIG. 3) extended portion 44. The extended portion 44 is formed at a position which is biased in either direction along the width direction (X direction) of the connection with the liquid crystal display panel 10 of the first flexible circuit board 30. The cutout 40 is formed on the biased side.

Figure 4:
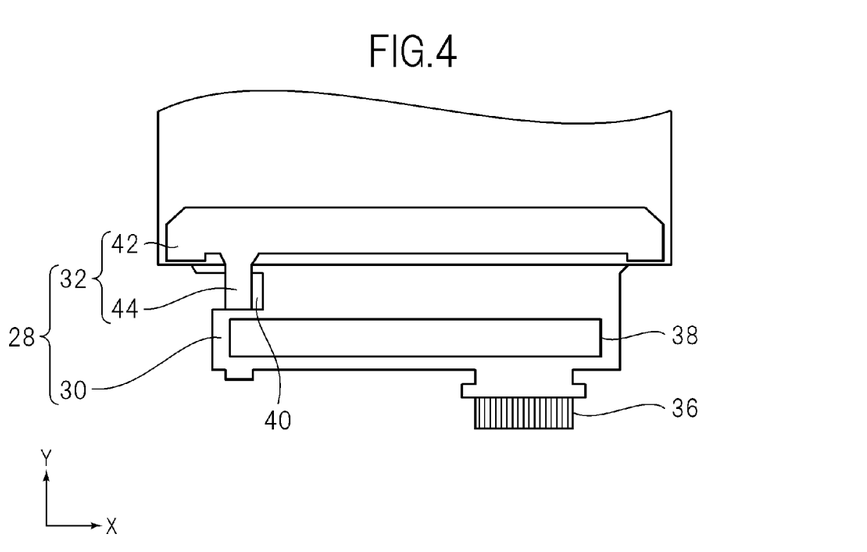
FIG. 4 is a diagram which shows the liquid crystal display device during manufacturing.

FIG. 4 is a diagram which shows the liquid crystal display device during manufacturing, and in which the flexible circuit board 28 is in a state of being bent once. In this first process, the extended portion 44 of the flexible circuit board 28 shown in FIG. 3 is bent as shown in FIG. 4. In the state shown in FIG. 4, the extended portion 44 of the second flexible circuit board 32 is bent so as to pass through the cutout 40 of the first flexible circuit board 30. Specifically, the extended portion 44 of the second flexible circuit board 32 is bent at a position which is adjacent to the first flexible circuit board 30 rather than the position which is the middle of the mounting unit 42 and the first flexible circuit board 30. The direction of bent portioning in the extended portion 44 from the first flexible circuit board 30 is the direction of the display surface 16 (behind the paper in FIG. 4) of the liquid crystal display panel 10. In addition, the extended portion 44 extends in the direction of the liquid crystal display panel 10 from the first flexible circuit board 30. The mounting unit 42 of the light emission component 24 is arranged at a position which is overlapped with the liquid crystal display panel 10, or is overlapped at least with the frame 26. That is, in the process, the extended portion 44 is bent on the display surface 16 side, however, the mounting unit 42 in which the light emission components are arranged is arranged on the rear surface 18 side.

In the subsequent process (second process), as shown in FIGS. 1 and 2, the first flexible circuit board 30 of the flexible circuit board 28 shown in FIG. 4, which is bent, is further bent by covering the end portion of the first substrate 14 and the frame 26. In the state shown in FIG. 2, the first flexible circuit board 30 is pulled out from the end portion of the liquid crystal display panel 10, and is bent so as to face the rear surface 18 of the liquid crystal display panel 10, or at least the upper part of a rear surface of the frame 26. The cutout 40 of the first flexible circuit board 30 is formed at the bent portion. The first flexible circuit board 30 and the rear surface 18 of the liquid crystal display panel 10, or at least the rear surface of the frame 26 are overlapped with each other with a gap (refer to FIG. 2). The external terminal 36 is arranged on the rear surface 18 side of the liquid crystal display panel 10 (refer to FIG. 1).

According to the second process, the first flexible circuit board 30 is formed to be extended to the rear surface side of the backlight 22 by covering the end portion of the substrate 14 from the connected portion to the liquid crystal display panel 10. In addition, the portion of the first flexible circuit board 30 which covers the end portion of the substrate 14 is a first bent portion 281 which is convex in the direction away from the end portion of the substrate 14. The first flexible circuit board 30 is extended to the rear surface side of the backlight 22 from the connection terminal 34 through the first bent portion 281.

The second flexible circuit board 32 includes the mounting unit 42 on which light emission components 24 are mounted, and the extended portion 44 which connects the mounting unit 42 and the first flexible circuit board 30 to each other. In the second flexible circuit board 32, a part of the extended portion 44 is arranged on the rear surface side of the first flexible circuit board 30. This structure is achieved by bent portioning the extended portion 44. The extended portion 44 has a second bent portion 282 which is convex in the opposite direction to the first bent portion 281 from the first flexible circuit board 30 on the rear surface side of the backlight 22. A part of the extended portion 44 is arranged further on the rear surface side (front side of the rear surface) than the first flexible circuit board 30 which is arranged on the rear surface side of the backlight 22 by the second bent portion 282. In addition, the extended portion 44 has a third bent portion 283 which is convex in the same direction as the first bent portion 281 in the vicinity of the first bent portion 281. The third bent portion 283 is connected to the mounting unit 42 which is arranged between the first flexible circuit board 30 on the rear surface side of the backlight and the light guide plate 23. With this structure, the light emission component 24 is arranged facing the light incident surface which is positioned on the guide plate 23 side.

As shown in FIG. 2, the mounting unit 42 of the second flexible circuit board 32 is arranged on the rear surface 18 side of the liquid crystal display panel 10. The surface on which the light emission components 24 are mounted faces the rear surface 18 of the liquid crystal display panel 10. The first flexible circuit board 30 is overlapped with the other surface of the mounting unit 42 which is opposite the surface on which the light emission components 24 are mounted, with a space therebetween. As shown in FIG. 1, the first flexible circuit board 30 is extended in the direction on the opposite side to the bent side thereof (upper side in FIG. 1) so as to go beyond the upper side of the mounting unit 42. The external terminal 36 is arranged at a position which is beyond the mounting unit 42.

As shown in FIG. 1, the extended portion 44 is extended from a portion which overlaps with an outer surface 46 (the surface which faces the opposite side to the liquid crystal display panel 10) of the first flexible circuit board 30 so as to go beyond (to the upper side in FIG. 1) the first flexible circuit board 30. In addition, the extended portion 44 is bent so as to slightly return to the direction of the first flexible circuit board 30 (the lower side in FIG. 1), and is connected to the first flexible circuit board 30.

As shown in FIG. 2, the extended portion 44 of the second flexible circuit board 32 passes through the cutout 40 of the first flexible circuit board 30, and is extended onto the outer surface 46 of the first flexible circuit board 30 from the mounting unit 42 in which the light emission components 42 are included. The extended portion 44 is pulled out from the mounting unit 42, and is bent so as to return to the upper direction of the mounting unit 42. In addition, the extended portion 44 is overlapped with the first flexible circuit board 30, on the outer surface 46 of the first flexible circuit board 30. As a result, according to the embodiment of the invention, the first flexible circuit board 30 and the extended portion 44 have an intersecting structure in the thickness direction of the flexible circuit board 28. In addition, according to the embodiment, since the extended portion 44 passes through the cutout 40, it is possible to bent portion the extended portion 44 without increasing the width of the flexible circuit board 28.

Figure 5:
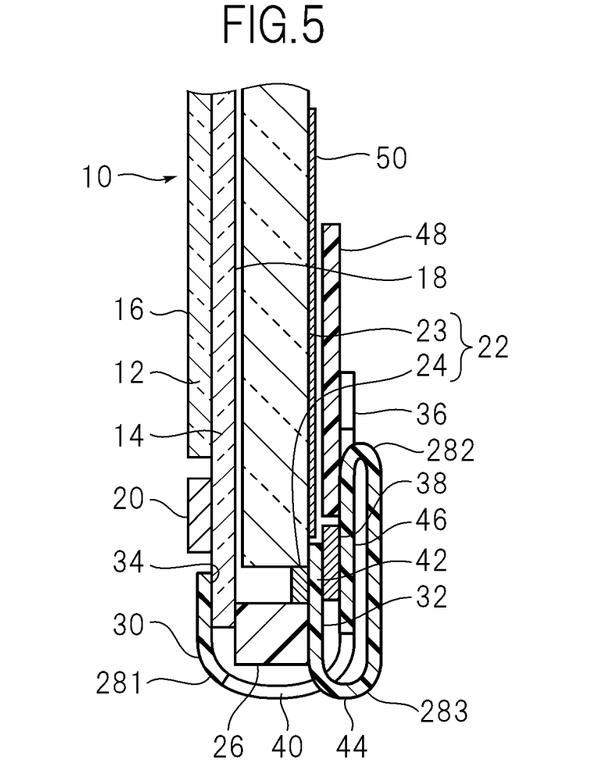
FIG. 5 is a diagram which describes an effect of the liquid crystal display device according to the first embodiment.

According to the embodiment, the extended portion 44 is arranged on the outer side of the first flexible circuit board 30 (refer to FIG. 1). For this reason, it is possible to secure a wide space inside the first flexible circuit board 30 (the liquid crystal display panel 10 side). As shown in FIG. 5, it is possible to insert a circuit board 48 in the space. For example, a circuit for driving an electronic device such as a mobile phone or the like in which the liquid crystal display device is incorporated is mounted onto the circuit board 48. In addition, according to the embodiment, the extended portion 44 of which the width is narrower than the first flexible circuit board 30 is arranged on the outer surface 46 side. For this reason, it is possible to prevent the extended portion 44 from bent portioning in the above described space which is made between the first flexible circuit board 30 and the backlight. It is possible to insert the circuit board 48 deep into the space, and to increase the region where the circuit board 48 can be arranged, since there is no bent portioning in the space.

Second Embodiment

Figure 6:
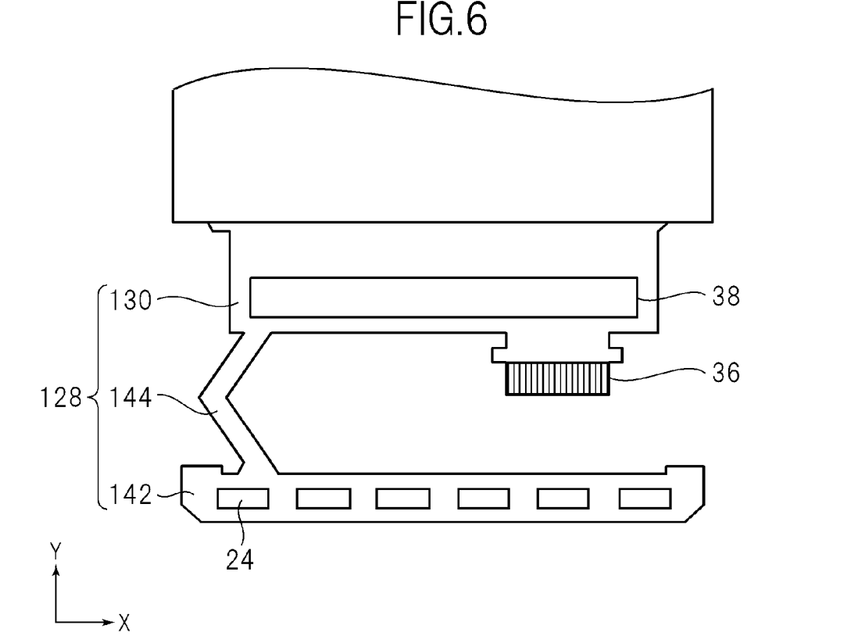
FIG. 6 is a diagram which shows a flexible circuit board being expanded in a liquid crystal display device according to a second embodiment.
Figure 7:
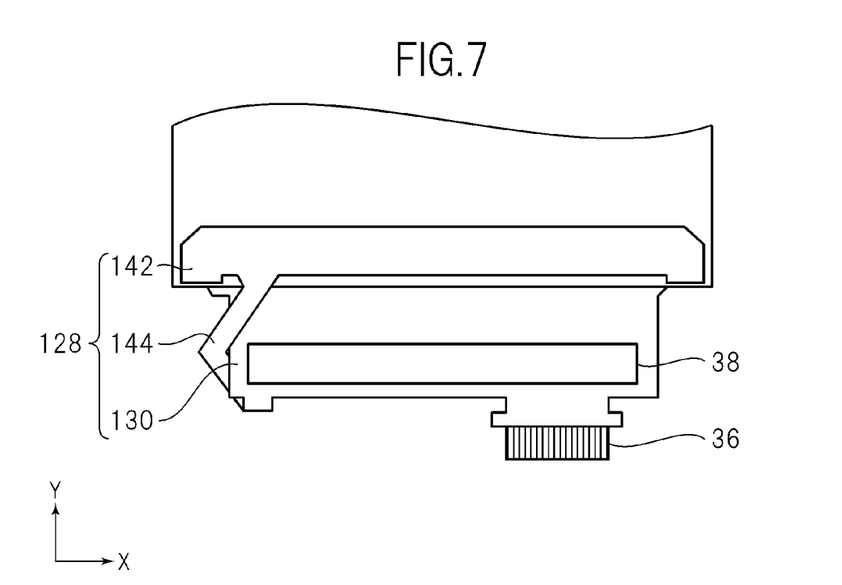
FIG. 7 is a diagram which shows the liquid crystal display device during manufacturing.
Figure 8:
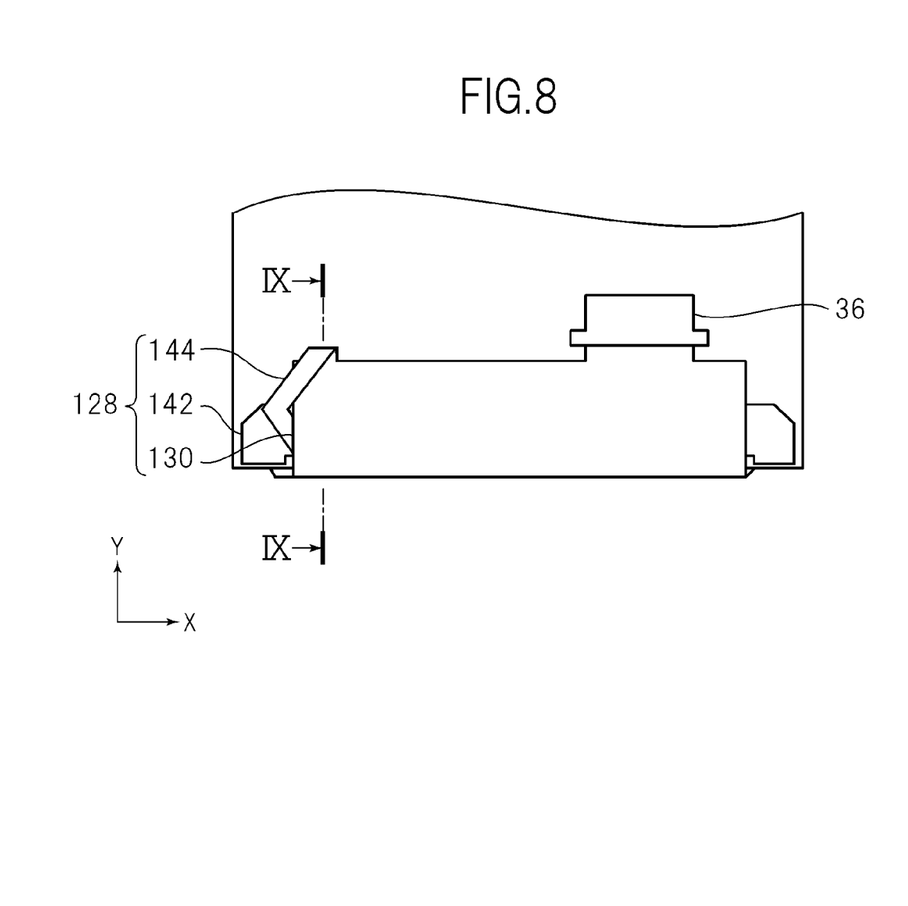
FIG. 8 is a diagram which shows a rear surface of the liquid crystal display device according to the second embodiment.
Figure 9:
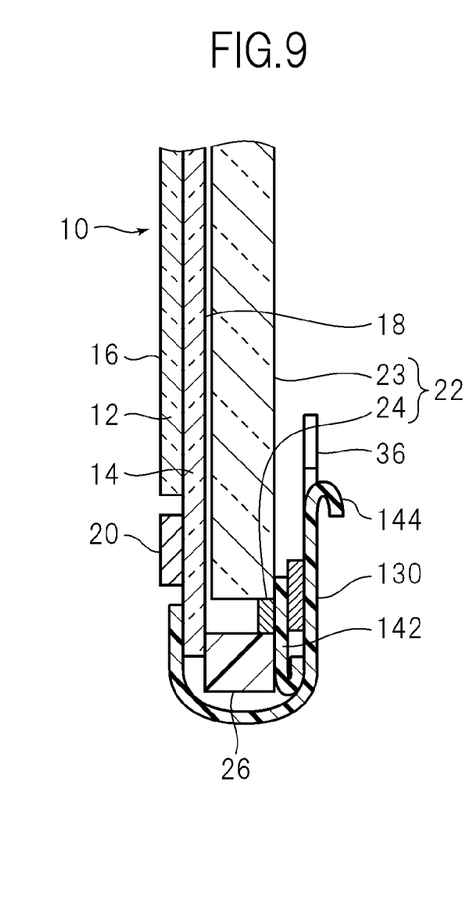
FIG. 9 is an enlarged cross-sectional view which is cut along line IX-IX of the liquid crystal display device in FIG. 8.

FIG. 6 is a diagram in which a liquid crystal display device according to a second embodiment is shown by expanding a flexible circuit board. FIG. 7 is a diagram which shows the liquid crystal display device during manufacturing. FIG. 8 is a diagram which shows a rear surface of the liquid crystal display device according to the second embodiment. FIG. 9 is an enlarged cross-sectional view of the liquid crystal display device in FIG. 8 which is cut along line IX-IX.

When compared to the flexible circuit board 28 (FIG. 3) which is described in the first embodiment, a flexible circuit board 128 shown in FIG. 6 has a planar shape with an extended portion 144 which is bent, and without a cutout. In contrast to the extended portion 44 in FIG. 3 which is straightly extended, the extended portion 144 according to the embodiment is bent to the outside (X direction) of a first flexible circuit board 130, and is extended in the Y direction.

As shown in FIG. 7, in a first process, the extended portion 144 is bent. The extended portion 144 which is bent once is extended from a mounting unit 142 so as to protrude from the first flexible circuit board 130. Specifically, the extended portion 144 is extended from the mounting unit 142 by being overlapped with one surface of the first flexible circuit board 130 (the surface facing the same direction as the rear surface 18 of the liquid crystal display panel 10), and protrudes from the first flexible circuit board 130. The protruded extended portion 144 is extended so as to overlap with the other surface of the first flexible circuit board 130 (the surface facing the same direction as the display surface 16 of the liquid crystal display panel 10), due to the planar shape which is bent, and is connected to the first flexible circuit board 130.

In the second process, the bent extended portion 144 and the first flexible circuit board 130 are bent at the same time. In order to obtain the liquid crystal display device shown in FIGS. 8 and 9, the flexible circuit board 128 shown in FIG. 7 is further bent. The details of the liquid crystal display device as a finished product were explained in the above described descriptions of the embodiment and the descriptions of the first embodiment. As shown in FIG. 9, in the embodiment, as well, it is possible to secure a wide space inside the first flexible circuit board 130.

Third Embodiment

Figure 10:
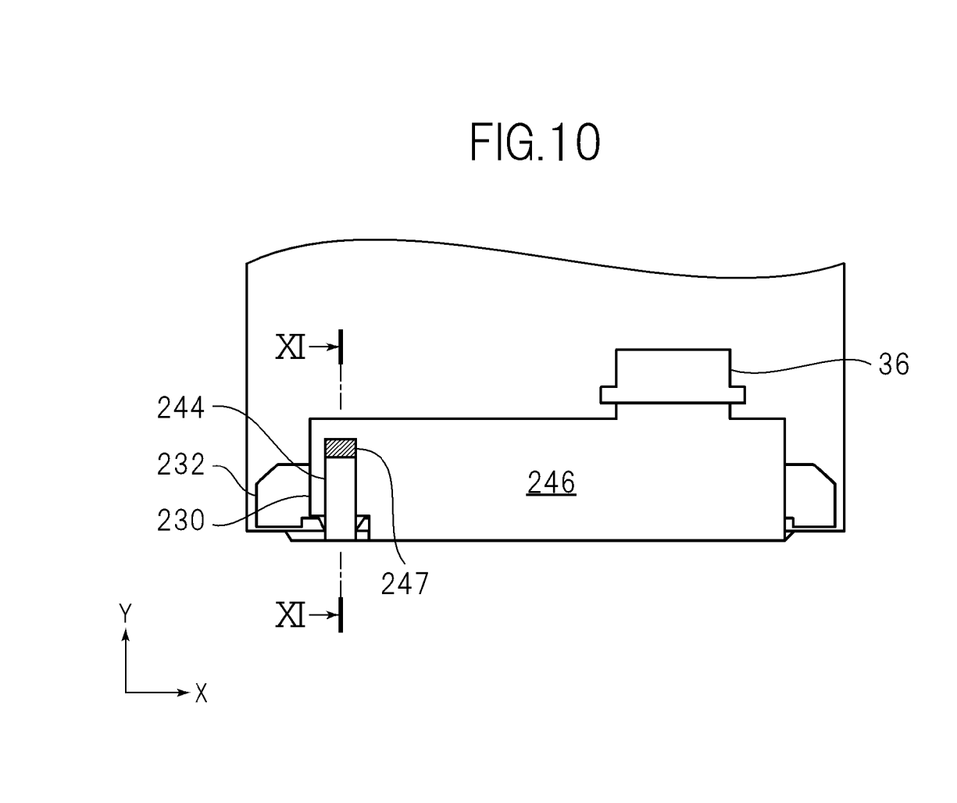
FIG. 10 is a diagram which shows a rear surface of a liquid crystal display device according to a third embodiment.
Figure 11:
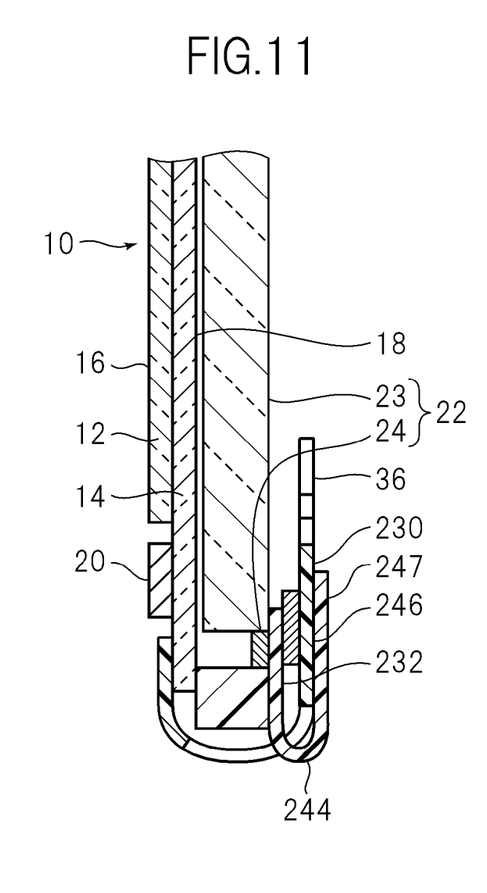
FIG. 11 is an enlarged cross-sectional view which is cut along line XI-XI of the liquid crystal display device in FIG. 10.

FIG. 10 is a diagram which shows a rear surface of a liquid crystal display device according to a third embodiment. FIG. 11 is an enlarged cross-sectional view of the liquid crystal display device shown in FIG. 10 which is cut along line XI-XI.

According to the embodiment, a first flexible circuit board 230 and second flexible circuit board 232 are separate members. Specifically, an extended portion 244 is bonded to the first flexible circuit board 230 at a portion 247 which is overlapped with an outer surface 246 of the first flexible circuit board 230, and is electrically connected thereto. The configuration of the embodiment corresponds to the content which is described in the first embodiment, other than the difference based on the configuration. Even in the embodiment, it is also possible to secure a wide space inside the first flexible circuit board 230.

The present invention is not limited to the above described embodiment, and can be modified in various ways. For example, the configuration which has been described in the embodiments can be substituted with substantially the same configuration, a configuration which can exhibit the same effect, or a configuration in which the same object is obtained.

What is claimed is:

1. A liquid crystal display device comprising:
a first flexible circuit board in which a liquid crystal display panel having an image display surface, and a rear surface which is opposite the display surface, a connection terminal for being electrically connected to the liquid crystal display panel, and an external terminal for being electrically connected to the outside are formed; and
a second flexible circuit board which includes a mounting portion for mounting light emission components, and an extended portion for being electrically connected to the first flexible circuit board,
wherein the mounting portion is arranged in the rear surface side of the liquid crystal display panel by making a surface on which the light emission components are mounted face the rear surface of the liquid crystal display panel,
wherein a portion of the first flexible circuit board at which the connection terminal is formed is bonded to an end portion of the display surface side of the liquid crystal display panel, is pulled out from the end portion of the liquid crystal display panel, and is bent and overlapped with a surface opposite the surface on which the light emission components of the mounting portion are mounted with a space, in which the external terminal is arranged in the rear surface,
wherein the extended portion is pulled out from the mounting portion, is bent so as to return to the direction of the mounting portion, and is overlapped with the first flexible circuit board on an outer surface of the first flexible circuit board,
wherein the first flexible circuit board includes a first bent portion which is convex in the direction away from the end portion of the liquid crystal display panel, and is extended to the rear surface side of the liquid crystal display panel from the connection terminal which is connected to the liquid crystal display panel through the first bent portion, and
wherein the extended portion is arranged at the rear surface side rather than the first flexible circuit board which is arranged at the rear surface side of the liquid crystal display panel through a second bent portion which is convex in the direction opposite to the first bent portion from the first flexible circuit board on the rear surface side of the liquid crystal display panel, and is connected to the mounting portion through a third bent portion which is convex in the same direction as the first bent portion.

2. The liquid crystal display device according to claim 1, wherein the first flexible circuit board and the second flexible circuit board are integrally formed, and
wherein the extended portion extends from a portion where the extended portion is overlapped with the outer surface of the first flexible circuit board so as to go beyond the first flexible circuit board, is bent so as to return to the direction of the first flexible circuit board, and is connected to the first flexible circuit board.

3. The liquid crystal display device according to claim 1, wherein the first flexible circuit board and the second flexible circuit board are formed as separate members, and
wherein the extended portion is bonded to the first flexible circuit board at a portion where the extended portion is overlapped with the outer surface of the first flexible circuit board, and is electrically connected to the first flexible circuit board.

4. The liquid crystal display device according to claim 1, wherein a cutout of which the depth is the direction along a side of the end portion is formed in the first flexible circuit board, at a portion which is pulled out from the end portion of the liquid crystal display panel, and
wherein the extended portion is extended onto the outer surface of the first flexible circuit board from the mounting portion through the cutout.

5. The liquid crystal display device according to claim 1, wherein the extended portion is extended from the mounting portion so as to protrude from the first flexible circuit board, and has a planar shape which extends so as to return to the direction of the first flexible circuit board at a position where overlapping with the first flexible circuit board is avoided.

6. The liquid crystal display device according to claim 1, wherein the first flexible circuit board has the connection terminal and the external terminal at end portions opposite each other, and has the external terminal at the tip end of the liquid crystal display panel which is pulled out from the end portion.

7. The liquid crystal display device according to claim 1, further comprising:
electronic components which are mounted onto the first flexible circuit board.

8. The liquid crystal display device according to claim 1,
wherein the first flexible circuit board and the second flexible circuit board are connected to each other only at the extended portion, and
wherein the extended portion is formed at a position which is biased in either direction along the width direction of a connection portion of the first flexible circuit board to the liquid crystal display panel.

9. The liquid crystal display device according to claim 1,
wherein the first flexible circuit board is extended to the direction opposite the bent side so as to go beyond the mounting portion, and
wherein the external terminal is arranged at a position beyond the mounting portion.

10. A liquid crystal display device comprising:
a liquid crystal display panel which includes a first substrate which forms a thin film transistor, a second substrate which forms a color filter, and liquid crystal which is interposed between the first substrate and second substrate;
a backlight which is arranged at a rear surface side of the liquid crystal display panel; and
a flexible circuit board which is connected to the first substrate,
wherein the flexible circuit board has a first flexible circuit board and a second flexible circuit board which are integrally formed,
wherein the first flexible circuit board has a connection terminal which is connected to the liquid crystal display panel, and is extended to a rear surface side of the backlight by covering an end portion of the first substrate,
wherein the second flexible circuit board has a mounting portion on which light emission components are mounted, and an extended portion which connects the mounting portion to the first flexible circuit board,
wherein the extended portion of the second flexible circuit board is arranged at a rear surface side of the first flexible circuit board, and is arranged at the backlight side rather than the first flexible circuit board of which mounting portion is arranged on the rear surface side of the backlight,
wherein the first flexible circuit board includes a first bent portion which is convex in the direction away from the end portion of the first substrate, and is extended to the rear surface side of the backlight from the connection terminal which is connected to the liquid crystal display panel through the first bent portion, and
wherein the extended portion is arranged at the rear surface side rather than the first flexible circuit board which is arranged at the rear surface side of the backlight through a second bent portion which is convex in the direction opposite to the first bent portion from the first flexible circuit board on the rear surface side of the backlight, and is connected to the mounting portion through a third bent portion which is convex in the same direction as the first bent portion.

11. The liquid crystal display device according to claim 10,
wherein the first flexible circuit board includes an external connection terminal to which data is input.

* * * * *